United States Patent
Karulkar et al.

(10) Patent No.: US 10,446,819 B2
(45) Date of Patent: Oct. 15, 2019

(54) APPARATUS AND METHOD FOR DIRECTED VENT GAS EXPULSION IN BATTERY CELLS

(71) Applicant: Ford Global Technologies, LLC, Dearborn, MI (US)

(72) Inventors: Mohan Karulkar, Dearborn, MI (US); Andrew Robert Drews, Ann Arbor, MI (US); Brian Joseph Robert, St. Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 15/716,561

(22) Filed: Sep. 27, 2017

(65) Prior Publication Data
US 2019/0097195 A1    Mar. 28, 2019

(51) Int. Cl.
*H01M 2/02* (2006.01)
*H01M 2/12* (2006.01)

(52) U.S. Cl.
CPC ......... *H01M 2/1282* (2013.01); *H01M 2/021* (2013.01); *H01M 2/0212* (2013.01); *H01M 2/1252* (2013.01)

(58) Field of Classification Search
CPC .. H01M 2/021; H01M 2/0267; H01M 2/1276; H01M 2/1282
See application file for complete search history.

(56) References Cited

U.S. PATENT DOCUMENTS

| | | | |
|---|---|---|---|
| 6,296,967 B1 * | 10/2001 | Jacobs | H01M 2/1061 429/181 |
| 8,518,569 B2 | 8/2013 | Murphy et al. | |
| 9,023,503 B2 | 5/2015 | Seong et al. | |
| 9,276,242 B2 | 3/2016 | Dämon et al. | |
| 9,379,365 B2 | 6/2016 | Schmieder et al. | |
| 9,385,404 B2 | 7/2016 | Yoon et al. | |
| 2006/0234119 A1 | 10/2006 | Kruger et al. | |
| 2011/0003185 A1 | 1/2011 | Kritzer | |
| 2012/0107663 A1 | 5/2012 | Burgers et al. | |
| 2013/0095352 A1 | 4/2013 | Yamauchi et al. | |
| 2013/0122336 A1 * | 5/2013 | Park | H01M 2/0212 429/82 |
| 2013/0157099 A1 | 6/2013 | Anderson | |
| 2013/0280596 A1 | 10/2013 | Lee et al. | |
| 2014/0147712 A1 * | 5/2014 | Lee | H01M 2/0212 429/61 |
| 2014/0248515 A1 | 9/2014 | Wayne et al. | |
| 2015/0171411 A1 | 6/2015 | Kobayashi et al. | |

(Continued)

FOREIGN PATENT DOCUMENTS

GB    2537431 A    10/2016

*Primary Examiner* — Jonathan Crepeau
(74) *Attorney, Agent, or Firm* — David Kelley; Brooks Kushman, P.C.

(57) ABSTRACT

A battery containment structure is provided. The battery containment structure may include a first pliable pouch, a second pliable pouch, and a vent. The first pliable pouch may surround a battery active region. The second pliable pouch may surround the first pliable pouch. The vent may be carried by the first pliable pouch and configured to vent gas from the battery active region responsive to a pressure or temperature of the gas surpassing a predetermined threshold.

17 Claims, 1 Drawing Sheet

(56) References Cited

U.S. PATENT DOCUMENTS

| | | | |
|---|---|---|---|
| 2016/0036024 A1* | 2/2016 | Choi | H01M 2/1229 |
| | | | 429/54 |
| 2016/0093857 A1 | 3/2016 | DeKeuster et al. | |
| 2016/0204398 A1 | 7/2016 | Moon et al. | |
| 2016/0248135 A1 | 8/2016 | Kim et al. | |
| 2016/0254504 A1 | 9/2016 | Kim et al. | |
| 2016/0293926 A1 | 10/2016 | Yamada | |

* cited by examiner

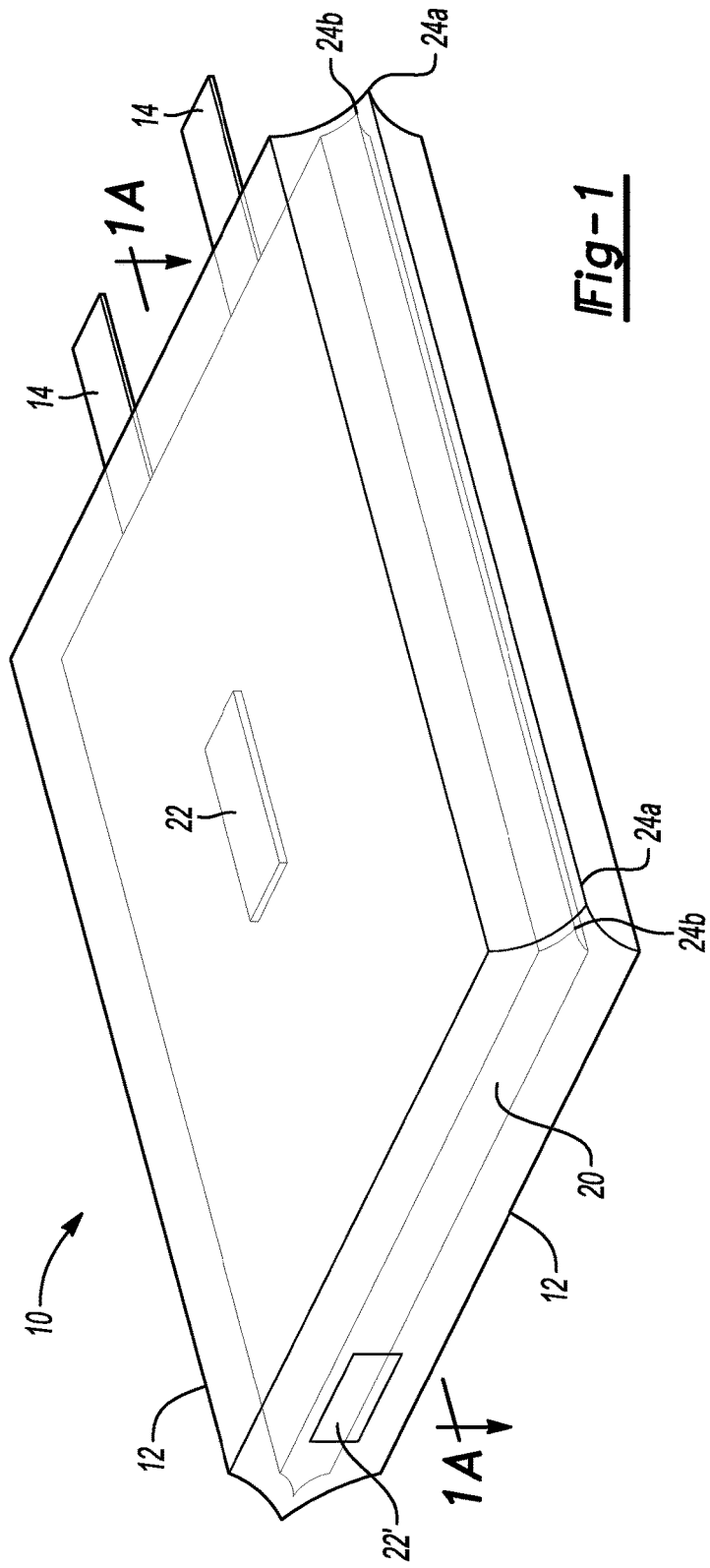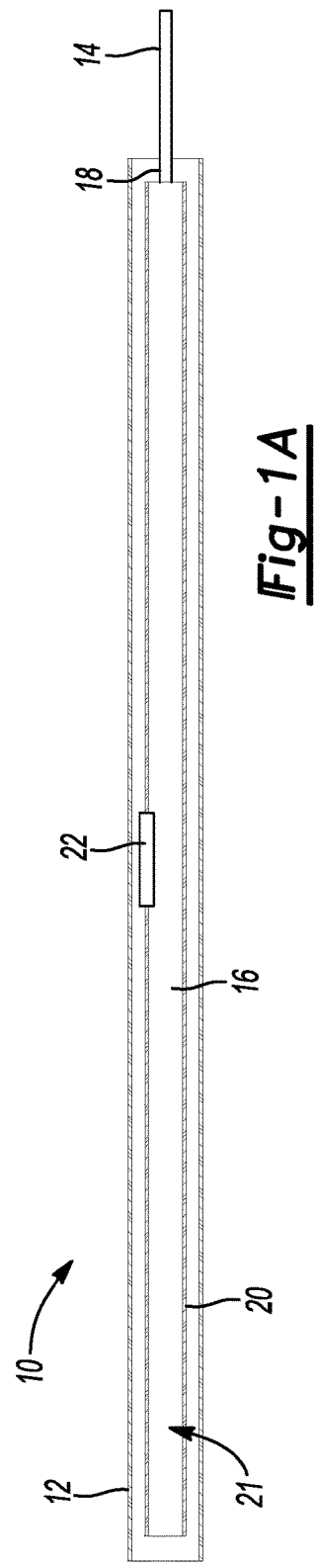

APPARATUS AND METHOD FOR DIRECTED VENT GAS EXPULSION IN BATTERY CELLS

TECHNICAL FIELD

The present disclosure relates to the field of batteries and battery modules.

BACKGROUND

Hybrid vehicles typically include a high voltage battery pack adapted to provide power to various components of the vehicles, including motors, transmissions, and electrical accessories. A battery pack may consist of various chemistries, such as lithium ion, nickel metal hydride, or nickel cadmium. The battery pack may include multiple cells connected in series, parallel, or series/parallel configurations. Each cell may include a cathode, an anode, and an electrolyte as well as external electrical connections to the anode and cathode. The electrolyte is a medium that allows the ions to flow between the anode and the cathode. The anode and cathode are in electrical contact with metal current collectors which provide a means to deliver and receive electron current to an external device. It is the electrochemical reactions that occur within the cell that allows a battery pack to serve as an energy source.

The performance of the battery packs may degrade overtime because of irreversible chemical reactions at the anode or cathode during normal operation, or during abuse conditions, including but not limited to overcharging, internal shorting, external shorting, and over-discharge, among others. Gas build-up and subsequent increase in pressure within a cell may occur from the decomposition of electrolyte at the surface of the anode or cathode, such as during abuse conditions. The increase in pressure may occur gradually due to slow decomposition of the electrolyte over the cell's life, or may occur rapidly in response to a temperature increase in the cell. Depending on the battery type, cell venting may be characterized by the cell being pressurized until a sudden discharge of gases or liquids from the cell occurs, or propulsion of the liquid electrolyte out of the cell occurs. Some batteries may include vent ports fitted with burst-relief devices to accommodate a designed level of pressurization, and to release built-up gasses, or electrolyte if the pressure exceeds a designed margin.

SUMMARY

According to one embodiment of this disclosure, a battery containment structure is provided. The battery containment structure may include a first pliable pouch, a second pliable pouch, and a vent. The first pliable pouch may surround a battery active region. The second pliable pouch may surround the first pliable pouch. The vent may be carried by the first pliable pouch and configured to vent gas from the battery active region responsive to a pressure or temperature of the gas surpassing a predetermined threshold.

The vent may be a one-way pressure valve or a temperature sensitive burst membrane.

The battery containment structure may include an exterior vent. The exterior vent may be carried by the second pliable pouch that surrounds the first pliable pouch. The exterior vent may be configured to vent gas from the second pliable pouch responsive to a pressure or a temperature of the gas surpassing a predetermined threshold.

According to another embodiment of this disclosure, a method of operating a battery system is provided. The method may include venting a gas created by a battery active region disposed within a first pliable pouch through a vent carried by the first pliable pouch into a second pliable pouch that surrounds the first pliable pouch. The venting may occur in response to a pressure or a temperature of the gas surpassing a first predetermined threshold.

The first predetermined threshold and the second predetermined threshold may be the same.

According to yet another embodiment of this disclosure a battery system is provided. The battery system may include a battery active region connected to a battery terminal, a first pliable pouch, a second pliable pouch, and a vent. The first pliable pouch may surround the battery active region. The second pliable pouch may surround the first pliable pouch. The vent may be carried by the first pliable pouch and configured to vent gas from the battery active region responsive to a pressure or temperature of the gas surpassing a predetermined threshold.

BRIEF DESCRIPTION OF THE DRAWINGS

FIG. 1 is a perspective view of a battery cell.

FIG. 1-A is a cross-sectional view taken along the lines 1-A in FIG. 1.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

With mass-production of batteries, a variety of battery formats have been developed. Example battery formats include cylindrical cells, button cells, prismatic cells, frame cells, and pouch cells. The pouch cell design represents an efficient use of space and achieves about 90-95% packaging efficiency. Instead of using a metallic cylinder and glass-to-metal electrical feed-through, conductive foil tabs are typically welded to the electrodes and are fully sealed while extending outside of the pouch. By eliminating a metal enclosure, the weight of the pouch cell is reduced. Frame cells may include a rigid plastic frame and pliable polymeric sheets that enclose the frame or adhered to a top and bottom surface of the frame.

While a pouch cell is a lightweight solution to the battery design, the pouch format presents a number of considerations such as requirement for support and space to expand. Additional concerns are exposure to humidity and high temperatures which may shorten life of the cell. Swelling represents yet another concern, for example swelling by up to 8-10% over 500 cycles may be typical with some types of pouch cells. Yet, pouch cells have become popular, especially in the same performance criteria as cylindrical cells. Pouch cells have been successfully utilized in consumer, military, as well as automotive applications. Relatively large flat pouch cell packs have been applied in electric powertrains and energy storage systems. Relatively small pouch cells have been used for portable applications with high load current requirements.

Battery cells may be enclosed or surrounded by a pouch or a rigid frame. As the cell of the battery begins to degrade, gasses are often generated within the active region and lead to a build-up of pressure. The pouch cells may not generally include a dedicated gas vent which could release gasses formed by reactions between the electrolyte solvent and the active materials. Pouch cells are usually constrained between pressure plates to ensure that an increase of internal pressure caused by gas generation puts the greatest stress on the seams and encourages a partially controlled gas release in a severe fault condition. Yet, experience from cell testing suggests that the location and distribution of the gas release may not occur in a predictable manner at consistent pressures or locations. It is advantageous to develop a secondary containment structure, capable of venting the gas in a predictable manner and location. Moreover, it may be advantageous to provide a gas adsorbing material within a portion of the cell or incorporate the venting mechanism within a battery cooling apparatus for a battery cell.

Referring to FIG. 1, a perspective view of a battery cell pouch 10, is illustrated. The battery cell pouch 10 includes a first pouch or exterior pouch 12 that encloses a second or interior pouch 20. The battery cell pouch 10 and second or interior pouch 20 may both be made from a polymeric material. The second pouch 20 may surround a battery active region 16 and two electrodes (not illustrated). The battery active region 16 may contain an anode, cathode, electrolyte, and separator layers in an organized configuration (wound, z-fold, stacked, etc.) connected to respective external electrode terminals 14. The battery terminals 14 extend through the second or interior pouch 20 and the first or exterior pouch 12.

The pouches 10 and 20 may each be comprised of a flexible sheet or sheets, and may be made from polyethylene (PE), polyester, imide, ketone, fluoropolymer, sulfone-based polymer, a resin, or a combination thereof. The pouches 10 and 20 may also be made from a bioplastic, and/or a biodegradable material. The pouches 10 and 20 may be a monolayer or alternatively include a plurality of layers. The sheet may be laminated and include a metal foil as an intermediate layer sandwiched between polymeric materials. The pouches 10 and 20 may also be a co-extruded film. The thickness of the pouches 10 and 20 may be from about 80 to 200 µm, 100 to 180 µm, 120 to 150 µm. Battery terminals 14 extend out of the of the exterior pouch 12. The terminals may have an electrical polarity (positive and negative) and provided a flow of electrical current from the positive pole or terminal 14 to the negative pole or terminal 14.

A ventilation device 22 may be formed in the inner or secondary pouch 20. The ventilation mechanism may be integrally formed in the inner or secondary pouch 20. The inner pouch 20 may have an aperture that the ventilation device 22 extends between. In other embodiments, the inner pouch 20 may define a hole or an aperture (not illustrated) that is smaller than ventilation device 22. In that case, the ventilation device may cover the aperture and connect to the inner pouch in the area surrounding the hole or aperture, forming a sealed device. The ventilation device 22 may be a pressure-sensitive burst seal that permits the release of gas from the inner pouch 20 to through the vent 22 once the pressure within the inner pouch 20 surpasses a predetermined pressure.

The pressure-sensitive burst seal may be attached to the inner pouch by an adhesive or other suitable means. In one or more embodiments, the burst seal may include a perforated section that is designed to burst at the predetermined pressure. Additionally, the seal may be a valve, such as a check valve, clack valve, non-return valve or one-way valve is a valve that normally allows fluid (liquid or gas) to flow through it in only one direction. In one or more embodiments, the ventilation device 22 may be a temperature-sensitive burst seal. A temperature sensitive burst seal may break or burst when the temperature within or of the inner pouch 20 reaches a predetermined temperature. In other embodiments, the ventilation device may be a burst seal that is both temperature and pressure sensitive.

If the ventilation device 22 releases gas from the inner pouch 20 to the outer pouch 12, the gas is then captured by the outer pouch. The ventilation device may be designed so that it vents or releases gas at a predetermined rate to prevent an accumulation of pressure within the outer pouch 12 too quickly. Alternatively, the ventilation device may allow a rapid release of gas from the inner pouch 20 to the outer pouch 12. The ventilation device 22 may stop the flow of gas from the inner pouch 20 to the outer pouch 12 once the pressure or temperature within the inner pouch and outer pouch are the same. As will be described in greater detail below, the ventilation device 22 may be placed within or on a hole or aperture of the inner pouch 20, outer pouch 12, or both.

The outer pouch 12 and inner pouch 20 each terminate at tapered "pinch sealed" edges. More specifically, the outer pouch 12 has a bottom surface and a top surface are placed adjacent to one another and the ends of the top surface and bottom surface have a tapered edge 24a. The inner pouch is configured similarly; the bottom surface of the inner pouch 20 and the top surface of the inner pouch 20 are also placed adjacent to one another within the outer pouch 12. The inner pouch has narrowed or tapered ends that are "pinch sealed" edges. The edges 24a and 24b may joined together by heat sealing. Heat sealing is the process of sealing one thermoplastic to another similar thermoplastic using heat and pressure. For example, one method may include constantly heating a die or sealing bar to apply heat to a specific contact area or path, along the edges 24a and 24b, to seal or weld the thermoplastics together. The edges may include thermally activated adhesives or other suitable materials for sealing. In other embodiments, the edges may be sealed by induction sealing, induction welding, or ultrasonic welding or other suitable sealing or fastening means.

Referring to FIG. 1-A, a cross-sectional view of a battery cell 10 taken along the lines 1-A, is illustrated. As was already mentioned, the cell 10 includes a secondary pouch or exterior pouch 12 that encompasses or encloses the first or interior pouch 20. The first or interior pouch 20 defines an aperture 21 that may accommodate the active region 16 and the two electrodes (not depicted) that are the constituent components of a battery cell 10. Battery tabs or terminals include an internal portion 18 that extend within the inner and outer pouches 20 and 12 to an external portion of the tabs 14 external to the outer pouch 12. The active region 16 is a chemical medium that allows the flow of electrical charge between the cathode and the anode. Over time the electrolyte may decompose and gas create a building pressure within the inner pouch. Alternatively, the gas created by the electrolyte may build rapidly due to a sudden increase in temperature within the cell. Previous battery cells have included vents that release gas directly to an external portion of the cell. By contrast, the gas from the inner pouch 20 is vented through the ventilation device 22 to an outer pouch 12.

A second ventilation device 22' may also be disposed on the outer pouch 12. The second ventilation device 22' may release or permit gas within the outer pouch 12 to an external area surrounding the outer pouch 12. The second ventilation device 22' may be positioned adjacent to a duct or an area of the vehicle to direct the gas away from the cell to prevent accumulation of gas near the cell 10. If more than one ventilation devices 22 22' is utilized, they each may be configured to allow for proportional venting. For example, the ventilation device 22 may have a threshold that is less than or greater than a threshold defined by the second ventilation device 22'. Note the second ventilation device 22' is not illustrated in FIG. 1-A because it is not positioned in line with the line 1-A. The second ventilation device 22' may be positioned anywhere on the outer pouch 12 and is not confined to the position illustrated in FIG. 1.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A battery containment structure comprising:
   a first pliable pouch surrounding a battery active region;
   a second pliable pouch surrounding the first pliable pouch, and configured to contain the first pliable pouch and battery active region therein during operation;
   a vent carried by the first pliable pouch configured to vent gas from the battery active region responsive to a pressure or temperature of the gas within the first pliable pouch surpassing a predetermined threshold; and
   a second vent carried by the second pliable pouch configured to vent the gas therein responsive to the pressure or temperature surpassing a second predetermined threshold.

2. The containment structure of claim 1, wherein the vent is a one-way pressure valve.

3. The containment structure of claim 1, wherein the vent is a temperature-sensitive burst membrane.

4. The containment structure of claim 1, wherein the first and second predetermined thresholds are same.

5. The containment structure of claim 1, wherein the second vent is a one-way pressure valve.

6. The containment structure of claim 1, wherein the second vent is a temperature-sensitive burst membrane.

7. A method of operating a battery system comprising:
   venting a gas created by a battery active region disposed within a first pliable pouch through a vent carried by the first pliable pouch into a second pliable pouch, configured to contain the first pliable pouch during operation, responsive to a pressure or temperature of the gas surpassing a first predetermined threshold; and
   venting the gas disposed within the second pliable pouch through a second vent carried by the second pliable pouch responsive to the pressure or temperature surpassing a second predetermined threshold.

8. The method of claim 7, further comprising closing the vent responsive to the pressure or temperature falling below the first predetermined threshold.

9. The method of claim 8, further comprising directing the gas from the second vent away from the second pliable pouch through a duct fluidly connected to the second vent.

10. The method of claim 8, further comprising equalizing the pressure of the gas within the first pliable pouch and the gas of the second pliable pouch by opening the first vent to achieve a first predetermined flow-rate and opening the second vent to achieve a second predetermined flow-rate.

11. The method of claim 8, further comprising closing the second vent responsive to the pressure or temperature falling below the second predetermined threshold.

12. The method of claim 11, wherein the first and second predetermined thresholds are same.

13. A battery system comprising:
   a battery active region connected to a battery terminal;
   a first pliable pouch containing the battery active region;
   a second pliable pouch containing the first pliable pouch;
   a vent carried by the first pliable pouch configured to vent gas from the battery active region responsive to a pressure or temperature of the gas surpassing a predetermined threshold; and a second vent carried by the second pliable pouch configured to vent the gas from the first pliable pouch responsive to the pressure or temperature surpassing a second predetermined threshold.

14. The battery system of claim 13, wherein the vent is a pressure-sensitive one-way valve.

15. The battery system of claim 13, wherein the vent is a pressure-sensitive burst membrane.

16. The battery system of claim 13, wherein the first and second vents each include a laminar sheet that is adhesively connected to the respective first and second pliable pouches.

17. The battery system of claim 13, wherein the second vent is a pressure-sensitive burst membrane.

* * * * *